United States Patent
Newman et al.

(10) Patent No.: US 11,418,372 B1
(45) Date of Patent: Aug. 16, 2022

(54) LOW-COMPLEXITY DEMODULATION OF 5G AND 6G MESSAGES

(71) Applicants: David E. Newman, Palos Verdes, CA (US); R. Kemp Massengill, Palos Verdes, CA (US)

(72) Inventors: David E. Newman, Palos Verdes, CA (US); R. Kemp Massengill, Palos Verdes, CA (US)

(73) Assignee: ULTRALOGIC 6G, LLC, Palos Verdes, CA (US)

( * ) Notice: Subject to any disclaimer, the term of this patent is extended or adjusted under 35 U.S.C. 154(b) by 0 days.

(21) Appl. No.: 17/710,157

(22) Filed: Mar. 31, 2022

Related U.S. Application Data

(60) Provisional application No. 63/321,879, filed on Mar. 21, 2022, provisional application No. 63/313,380, filed on Feb. 24, 2022, provisional application No. 63/272,352, filed on Oct. 27, 2021, provisional application No. 63/234,911, filed on Aug. 19, 2021, provisional application No. 63/220,669, filed on Jul. 12, 2021, provisional application No. 63/214,489, filed on Jun. 24, 2021, provisional application No. 63/210,216, filed on Jun. 14, 2021.

(51) Int. Cl.
  *H04W 8/00* (2009.01)
  *H04L 27/06* (2006.01)
  *H04L 5/00* (2006.01)

(52) U.S. Cl.
  CPC ............ *H04L 27/06* (2013.01); *H04L 5/0048* (2013.01)

(58) Field of Classification Search
  CPC ..... H04B 7/0639; H04B 7/088; H04L 5/0048; H04L 17/18; H04W 72/042; H04W 14/08; H04W 72/04
  USPC .................................................. 370/329, 328
  See application file for complete search history.

(56) References Cited

U.S. PATENT DOCUMENTS

| | | | |
|---|---|---|---|
| 10,090,980 B2 | 10/2018 | Nammi |
| 10,419,181 B2 | 9/2019 | Xia |
| 10,708,900 B2 | 7/2020 | Popovic |
| 10,833,823 B2 | 11/2020 | Nammi |
| 10,880,164 B2 | 12/2020 | Ghosh |
| 11,165,606 B2 | 11/2021 | Liu |
| 2012/0106473 A1 | 5/2012 | Tiirola |
| 2015/0282124 A1 | 10/2015 | Miao |

(Continued)

*Primary Examiner* — Phuoc H Doan
(74) *Attorney, Agent, or Firm* — Mayer & Williams PC

(57) ABSTRACT

Methods for demodulating wireless messages in 5G and 6G include comparing signal parameters of the message to a demodulation reference that is placed in close proximity to the message. The demodulation reference and the message may be transmitted in a concatenated fashion on a series of subcarriers at a single symbol-time, or on a series of symbol-times at a single subcarrier. The receiver may measure and record waveform parameters of the message signal as it is received, for subsequent separation and demodulation of the various message elements. The message may be modulated using classical amplitude-phase modulation, or pulse-amplitude modulation, or other modulation scheme. In each version, the receiver can measure the wave properties (amplitude and phase, branch amplitudes, etc.) of the demodulation reference, and then compare the same parameters of the message elements, thereby demodulating the message regardless of the modulation scheme.

20 Claims, 5 Drawing Sheets

(56) References Cited

U.S. PATENT DOCUMENTS

| | | |
|---|---|---|
| 2016/0119901 A1 | 4/2016 | Zhang |
| 2017/0230156 A1 | 8/2017 | Fakoorian |
| 2018/0242307 A1 | 8/2018 | Chen |
| 2019/0200326 A1 | 6/2019 | Shin |
| 2020/0145869 A1 | 5/2020 | Nammi |
| 2020/0259693 A1 | 8/2020 | Baldemair |
| 2020/0313818 A1* | 10/2020 | Wu .................. H04W 72/042 |
| 2021/0022117 A1* | 1/2021 | Yi ..................... H04L 5/0044 |
| 2021/0045160 A1 | 2/2021 | Irukulapati |
| 2021/0105117 A1 | 4/2021 | Abdelghaffar |

* cited by examiner

LOW-COMPLEXITY DEMODULATION OF 5G AND 6G MESSAGES

PRIORITY CLAIMS AND RELATED APPLICATIONS

This application claims the benefit of U.S. Provisional Patent Application Ser. No. 63/210,216, entitled "Low-Complexity Access and Machine-Type Communication in 5G", filed Jun. 14, 2021, and U.S. Provisional Patent Application Ser. No. 63/214,489, entitled "Low-Complexity Access and Machine-Type Communication in 5G", filed Jun. 24, 2021, and U.S. Provisional Patent Application Ser. No. 63/220,669, entitled "Low-Complexity Access and Machine-Type Communication in 5G", filed Jul. 12, 2021, and U.S. Provisional Patent Application Ser. No. 63/234,911, entitled "Short Demodulation Reference for Improved Reception in 5G", filed Aug. 19, 2021, and U.S. Provisional Patent Application Ser. No. 63/272,352, entitled "Sidelink V2V, V2X, and Low-Complexity IoT Communications in 5G and 6G", filed Oct. 27, 2021, and U.S. Provisional Patent Application Ser. No. 63/313,380, entitled "Short-Form 5G/6G Pulse-Amplitude Demodulation References", filed Feb. 24, 2022, and U.S. Provisional Patent Application Ser. No. 63/321,879, entitled "Low-Complexity Demodulation of 5G and 6G Messages", filed Mar. 21, 2022, all of which are hereby incorporated by reference in their entireties.

FIELD OF THE INVENTION

The disclosure pertains to wireless message demodulation, and particularly to methods for demodulating messages using a demodulation reference.

BACKGROUND OF THE INVENTION

A demodulation reference is a message or message portion that exhibits certain modulation levels of a modulation scheme. Demodulation references thereby assist the receiving entity in demodulating a subsequent message. In 5G and 6G, communications may be modulated according to PAM (pulse-amplitude modulation) in which the binary bits of a message are divided between two parallel signals or "branches". The two branches (termed I and Q) are amplitude-modulated according to the message bits, and then summed with a 90-degree phase offset before transmitting. The primary demodulation reference is a DMRS (demodulation reference signal) which is configured according to one of a number of pseudorandom sequences according to a complex formula. However, some user devices may have difficulty processing such 5G and 6G requirements, or accommodating the bulky DMRS in their reception. In addition, the fluctuating interference background in high-density wireless environments, such as a dense urban area or an automated factory environment, may cause demodulation faults, resulting in missed calls, reduced reliability, and time-consuming retransmissions. What is needed is a demodulation procedure configured for use by reduced-capability devices and high-performance users alike, suitable for messaging in both low-density and high-density wireless traffic environments.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY OF THE INVENTION

In a first aspect, there is a method for demodulating a wireless message, the method comprising: receiving a demodulation reference comprising one or more demodulation reference elements, each demodulation reference element modulated according to a modulation scheme; receiving a message comprising one or more message elements, each message element modulated according to the modulation scheme; determining, according to the demodulation reference elements, one or more modulation levels; for each message element, determining one or more modulation values; and demodulating each message element by comparing the one or more modulation values of the message element to the one or more modulation levels, and selecting the closest match.

In another aspect, there is a receiver in a wireless network, configured to: receive a demodulation reference comprising demodulation reference elements modulated according to a modulation scheme; determine, according to the demodulation reference elements, one or more modulation levels of the modulation scheme; associate a distinct numerical value to each of the one or more modulation levels; receive a message comprising message elements modulated according to the modulation scheme; for each message element, determine one or more modulation values; and for each modulation value, determine which particular modulation level most closely matches the modulation value, determine which numerical value is associated with the particular modulation level, and assign the numerical value so determined to the message element.

In another aspect, there is non-transitory computer-readable media in a memory of a base station of a wireless network comprising user devices, the media containing instructions that, when implemented by a computing environment, cause a method to be performed, the method comprising: receiving, from a user device, a demodulation reference and a message; determining, according to the demodulation reference, one or more modulation levels of a modulation scheme; associating, with each of the modulation levels, a numerical representation, respectively; determining, according to each message element of the message, one or more modulation values; selecting, for each modulation value, the modulation level closest to the modulation value; and concatenating the numerical values associated with the selected modulation values of the message elements.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

These and other embodiments are described in further detail with reference to the figures and accompanying detailed description as provided below.

BRIEF DESCRIPTION OF THE DRAWINGS

Like reference numerals refer to like elements throughout.

Figure 1A:
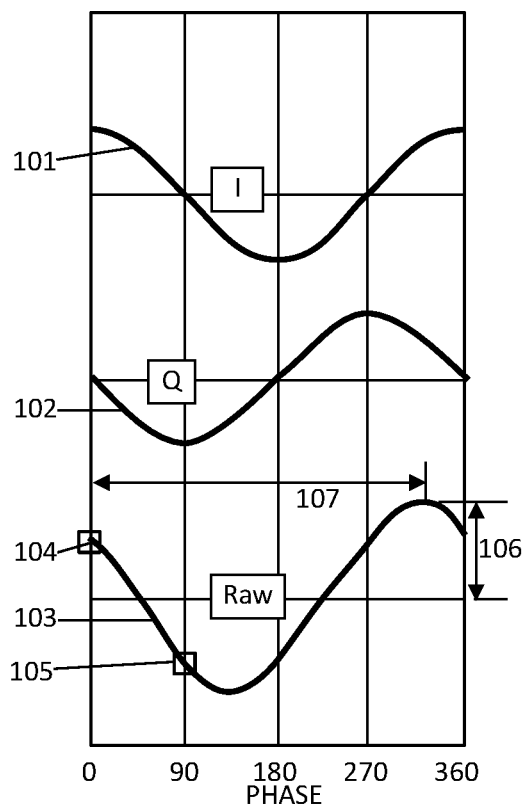
FIG. 1A is a schematic showing an exemplary embodiment of a wave modulated using pulse-amplitude modulation, according to some embodiments.

DETAILED DESCRIPTION 5G and 6G technologies are designed for eMBB (enhanced Mobile Broadband communications), URLLC (ultra reliable low latency communications), and mMTC (massive machine-type communication) generally involving large numbers of user devices such as vehicles, mobile phones, self-propelled and robotic machines, portable and stationary computers, and many other advanced wireless instruments. However, many future IoT (internet of things) use cases are expected to involve simple, low-cost, reduced-capability MTC (machine-type communication) wireless devices. For example, a temperature sensor or a door alarm or a timer, among innumerable other task-based wireless products, may include a low-cost processor such as a small microcontroller or an ASIC (application-specific integrated circuit) and may have minimal wireless communication needs. Future automated factories are expected to use large numbers of such single-purpose wireless devices in a high-density communication environment. Reduced-capability processors may have difficulty performing complex 5G/6G procedures, which were developed for highly competent devices that require high-performance communication services. Because both high-performance and reduced-capability devices share the same, limited electromagnetic spectrum, it would be tragic if the simpler machine-type applications are forced to develop a separate wireless technology, competing with 5G and 6G for bandwidth and locations. A much more efficient solution is to include, in 5G and 6G, a set of simpler protocols and defaults appropriate for the low-cost, low-demand MTC devices. Experience with 4G has shown that incorporating such flexibility into an already established radio-communication technology is difficult. Therefore, if 5G and 6G are to make accommodation for reduced-capability systems in IoT applications, appropriate procedures and options should be incorporated as early in the development as possible.

A related problem pertains to interference in high-density wireless environments where thousands or millions of devices are in radio range of each other, such as an urban center or a highly automated manufacturing center. Background interference from the sea of electromagnetic signaling may cause frequent modulation distortions in each message, degrading reliability, causing message faults, interruptions, delays, and missed calls, leading to severely limited network throughput. Moreover, the retransmissions resulting from such faults will contribute further to the overall background, making the underlying problem even worse. Interference is intrinsically bursty and frequency-rich, that is, fluctuating rapidly in both time and frequency. Demodulation references can mitigate the interference problem by updating the current amplitude and phase modulation levels to compensate for the current interference effects, and may thereby assist in demodulating a subsequent message accurately despite interference.

Systems and methods disclosed herein (the "systems" and "methods", also occasionally termed "embodiments" or "arrangements" or "versions", generally according to present principles) can provide urgently needed wireless communication protocols to reduce messaging complexity and delays, facilitate low-complexity demodulation, enable more frequent demodulation calibration in noisy environments, and provide readily available options to accommodate reduced-capability user devices, according to some embodiments. One motivation behind the present disclosure may be to provide demodulation procedures suitable for both high-performance and low-cost devices, in sparse rural as well as dense urban/industrial wireless environments. The disclosed systems and methods may enable a wireless receiver to demodulate a message that includes a demodulation reference. The message and its associated demodulation reference may be "frequency-spanning" if the message elements are transmitted simultaneously on successive subcarriers at a single symbol-time, or "time-spanning" if the message elements occupy multiple symbol-times at a single frequency. The demodulation reference is a short sub-message that exhibits some of the "modulation levels" (such as amplitude or phase levels) of the modulation scheme in use, so that the receiver can demodulate each message element by comparing the "modulation values" of each message element to the exhibited modulation levels of the demodulation reference. Thus the demodulation reference exhibits the "modulation levels" of the modulation scheme, and the message elements then provide "modulation values" to be compared with the modulation levels. Noise and interference can distort the waveform, causing shifts in the modulation values of the demodulation reference and the message elements. However, the receiver can mitigate most noise and interference by updating the modulation levels simultaneously, or in close proximity to, the message. If the message is frequency-spanning with a prepended demodulation reference, it is generally not feasible for the receiver to demodulate the message elements using that demodulation reference in real-time, because the message elements are received at the same time as the demodulation reference. Instead, the receiver can digitize and record the incoming waveform, using fast electronics and a large memory for example, and then subsequently analyze the stored data. Alternatively, the receiver can measure and record certain specific features of the waveform as received, such as amplitudes and phases of subcarrier signals, and then demodulate the message elements thereafter by comparing the message element parameters to the demodulation reference parameters. In this way, the receiver can mitigate a wide range of noise and interference, while accommodating various modulation schemes, according to some embodiments.

Among those modulation schemes are "classical" amplitude-phase modulation and "PAM" or pulse-amplitude modulation. In classical amplitude-phase modulation, each message element is amplitude modulated and separately (orthogonally) phase modulated, and the receiver can demodulate each message element by measuring the amplitude and phase of the "raw signal", that is, the as-received subcarrier waveform. The raw signal may be frequency downshifted, or other modifications for ease of signal processing, without changing the modulation parameters of the message elements. In PAM, on the other hand, each modulated message element is prepared by amplitude-modulating two sinusoidal signals separately, and then adding them together with a 90-degree phase shift. Each of the component signals may be called a "branch", such as the "I-branch" and "Q-branch" (I for in-phase, Q for quadrature-phase) or "real and imaginary", among other terms. The raw signal of a subcarrier is generally equal to the sum of the two branch signals. Hence, the branch signals can be deterministically related to the raw signal, and vice versa.

Demodulation in classical amplitude-phase modulation may include measuring characteristic amplitudes and phases of a demodulation reference, calculating other levels by interpolation, and storing the amplitude and phase levels in a "calibration set" in memory. In PAM, demodulation may include separating the branch signals of the demodulation reference according to phase, measuring the amplitude of each branch signal, and storing the branch amplitude levels, plus other levels obtained by calculation (such as interpolation), in the calibration set. In either case, the message may be demodulated by comparing parameters (branch amplitudes or raw-signal amplitude and phase) to the levels stored in the calibration set and selecting the closest match. Each of the levels in the calibration set may be assigned to a number, such as a binary number, and the demodulated message may be rendered as a sequence or concatenation of those numbers. If the demodulation reference (or references) is/are provided in close proximity to the message, noise and interference may distort the demodulation reference levels in a similar way to the message elements, so that the noise and interference may be largely canceled in the demodulation. For example, if the demodulation reference and message are transmitted frequency-spanning (simultaneously on sequential subcarriers) a time-synchronous mitigation of noise and interference may be obtained. If the demodulation reference and message are transmitted time-spanning (on sequential symbol-times at constant frequency) mitigation of narrow-band noise and interference may be obtained.

Terms herein generally follow 3GPP (third generation partnership project) standards, but with clarification where needed to resolve ambiguities. As used herein, "5G" represents fifth-generation, and "6G" sixth-generation, wireless technology in which a network (or cell or LAN Local Area Network or RAN Radio Access Network or the like) may include a base station (or gNB or generation-node-B or eNB or evolution-node-B or AP Access Point) in signal communication with a plurality of user devices (or UE or User Equipment or user nodes or terminals or wireless transmit-receive units) and operationally connected to a core network (CN) which handles non-radio tasks, such as administration, and is usually connected to a larger network such as the Internet. The time-frequency space is generally configured as a "resource grid" including a number of "resource elements", each resource element being a specific unit of time termed a "symbol period" or "symbol-time", and a specific frequency and bandwidth termed a "subcarrier" (or "subchannel" in some references). Symbol periods may be termed "OFDM symbols" (Orthogonal Frequency-Division Multiplexing) in references. The time domain may be divided into ten-millisecond frames, one-millisecond subframes, and some number of slots, each slot including 14 symbol periods. The number of slots per subframe ranges from 1 to 8 depending on the "numerology" selected. The frequency axis is divided into "resource blocks" (also termed "resource element groups" or "REG" or "channels" in references) including 12 subcarriers, each subcarrier at a slightly different frequency. The "numerology" of a resource grid corresponds to the subcarrier spacing in the frequency domain. Subcarrier spacings of 15, 30, 60, 120, and 240 kHz are defined in various numerologies. Each subcarrier can be independently modulated to convey message information. Thus a resource element, spanning a single symbol period in time and a single subcarrier in frequency, is the smallest unit of a message. Standard modulation schemes in 5G and 6G include BPSK (binary phase-shift keying), QPSK (quad phase-shift keying), 16QAM (quadrature amplitude modulation with 16 modulation states), 64QAM, 256QAM and higher orders. Most of the examples below relate to QPSK or 16QAM, with straightforward extension to the other levels of modulation. For example, 16QAM modulated according to PAM exhibits two phase levels at zero and 90 degrees (or in practice, for carrier suppression, ±45 degrees) and four amplitude levels including two positive and two negative, thus forming 16 distinct modulation states. For comparison, classical amplitude-phase modulation in 16QAM includes four positive amplitude levels and four phases of the raw signal, which are multiplexed to produce the 16 states of the modulation scheme. Communication in 5G and 6G generally takes place on abstract message "channels" (not to be confused with frequency channels) representing different types of messages, embodied as a PDCCH and PUCCH (physical downlink and uplink control channels) for transmitting control information, PDSCH and PUSCH (physical downlink and uplink shared channels) for transmitting data and other non-control information, PBCH (physical broadcast channel) for transmitting information to multiple user devices, among other channels that may be in use. In addition, one or more random access channels may include multiple random access channels in a single cell. "CRC" (cyclic redundancy code) is an error-checking code. "RNTI" (radio network temporary identity) is a network-assigned user code. "SNR" (signal-to-noise ratio) and "SINR" (signal-to-interference-and-noise ratio) are used interchangeably unless specifically indicated. "RRC" (radio resource control) is a control-type message from a base station to a user device. "Digitization" refers to repeatedly measuring a waveform using, for example, a fast ADC (analog-to-digital converter) or the like. A "sum-signal" is a waveform including the combined signals from a plurality of separately modulated subcarriers.

In addition to the 3GPP terms, the following terms are defined herein. Although in references a modulated resource element of a message may be referred to as a "symbol", this may be confused with the same term for a time interval ("symbol-time"), among other things. Therefore, each modulated resource element of a message is referred to as a "modulated message resource element", or more simply as a "message element", in examples below. A "demodulation reference" is a set of Nref modulated "reference resource elements" that exhibit levels of a modulation scheme (as opposed to conveying data). Thus integer Nref is the number of reference resource elements in the demodulation reference. A "calibration set" is one or more amplitude values (and optionally phase values), which have been determined according to a demodulation reference, representing the predetermined modulation levels of a modulation scheme. Generally the modulation scheme includes integer Nlevel predetermined amplitude or phase levels.

"PAM" (pulse-amplitude modulation, not to be confused with signal generation by rapid pulsatile energy bursts) is a message modulation technology in which binary bits of a message are allocated to two sinusoidal "branch" signals, which are amplitude-modulated to encode the message bits, and then summed with a 90-degree phase offset, and transmitted. (In contrast, "classical" amplitude-phase modulation includes amplitude modulation multiplexed with phase modulation of each message element.) A receiver can receive a PAM-transmitted raw signal, separate the two branch signals, and measure their amplitudes. The receiver can demodulate the message elements by separating the two branch signals of each message element, measuring their branch amplitudes, and comparing to a set of predetermined branch amplitude levels of the PAM modulation scheme. A "branch amplitude" is the amplitude of an I or Q branch signal, as determined by a receiver. The receiver can demodulate a message element in PAM by extracting its I and Q branch signals, measuring their branch amplitudes, and comparing to the predetermined amplitude levels of a calibration set. The predetermined modulation levels of the calibration set may be accumulated from the branch amplitudes of a preceding demodulation reference, plus additional levels calculated from the exhibited branch amplitudes, using interpolation or other calculations. Likewise, assuming classical amplitude-phase modulation, a receiver can determine the calibration set by measuring the raw-signal amplitude and phase of each demodulation reference element, optionally calculating intermediate levels if needed, and then comparing each message element's raw signal amplitude and phase to the calibration set. In either case, an "amplitude deviation" of a message element is the difference between its amplitude value and the closest predetermined amplitude level in the calibration set, and likewise for phases if measured. As a further option, the receiver may mix the two demodulation procedures, such as measuring the I and Q branch amplitudes of a message that was modulated in classical amplitude-phase modulation, or measuring the raw-signal amplitude and phase of a message that was modulated using PAM. The "modulation quality" of a message element is a measure of how close the message element modulation is to the closest predetermined amplitude or phase level of the modulation scheme, or equivalently how close the modulation of the message element is to the closest state of the modulation scheme, as indicated by amplitude (or phase) levels in the calibration set.

"Low-complexity" refers to devices and procedures necessary for wireless communication, exclusive of devices and procedures that provide high-performance communication. 5G/6G specifications include many procedures and requirements that greatly exceed those necessary for wireless communication, in order to provide high-performance communications at low latency and high reliability for users that demand it. Compared to scheduled and managed 5G/6G messaging, low-complexity procedures generally require less computation and less signal processing. For example, low-complexity procedures may be tailored to minimize the number of separate operations required of a device per unit of time. 5G and 6G specifications include a very wide range of options and contingencies and versions and formats and types and modes for many operations, to achieve maximum flexibility. A low-complexity specification may include defaults for each operation, and those defaults may be the simplest choices, or at least simpler than standard 5G and 6G procedures. "Simpler" procedures generally require fewer computation steps and/or smaller memory spaces than corresponding procedures in standard 5G/6G. Computation steps may be measured in floating-point calculations, for example.

"Reduced-capability" refers to wireless devices that cannot comply with 5G or 6G protocols, absent the systems and methods disclosed herein. For example, regular 5G and 6G user devices are required to receive a 5 MHz bandwidth in order to receive system information messages. Regular user devices are required to perform high-speed signal processing such as digitizing the received waveform, applying digital filtering or Fourier transforming an incoming waveform, phase-dependent integrating at several GHz frequency, and separating closely-spaced subcarriers. A reduced-capability device, on the other hand, may not need the high performance gained by such procedures, and may be incapable of performing them. A reduced-capability device may be able to receive a narrow-band wireless signal, demodulate the message, and interpret the content without further processing.

For economic reasons as well as commercial feasibility, future IoT application developers will demand ways to transmit messages using bandwidths and protocols appropriate to the simpler devices. It is important to provide such low-complexity options early in the 6G roll-out, while such flexibility can still be incorporated in the system design.

Turning now to the figures, in a first example, the branches of a PAM-modulated message element are compared to a classical amplitude-phase modulated message element.

FIG. 1A is a schematic showing an exemplary embodiment of a wave modulated using pulse-amplitude modulation, according to some embodiments. As depicted in this non-limiting example, waves representing modulated signals are shown as in an oscilloscope display, with voltage vertical and time (or phase) horizontal. A first wave 101 represents the real or "I" branch, phased at zero degrees with a particular amplitude as shown. The second wave 102 is the imaginary or "Q" branch, phased at 90 degrees, and has a negative amplitude in this case. The third wave 103 ("raw signal") is the sum of the first and second waves 101 and 102, representing the transmitted or received waveform. A receiver, upon detecting the raw signal wave 103, can demodulate it by measuring the zero-degree I amplitude, indicated as a square 104 at zero degrees, and the 90-degree Q amplitude 105. These values 104, 105 are the "branch amplitudes". In the absence of noise, the Q signal is zero at the instant (or phase) when the I branch is measured, and the I signal is zero when the Q branch is measured. Hence each phased measurement detects only one of the branches at a time, in principle. The receiver can then determine the modulation state according to the signs and ratios of those branch amplitude values. In some embodiments, the two branches are assumed to have the same predetermined amplitude levels, absent phase-dependent interference. In other embodiments, the I and Q branch amplitude levels can be determined separately, thereby compensating a wider range of interferences.

In some embodiments, the receiver can measure the amplitude and phase of the as-received raw signal 103 instead of, or in addition to, the I and Q branch amplitudes. The amplitude of the raw signal 103 is shown as 106, and the phase (measured to the positive peak) is shown as 107. The raw signal amplitude and phase, or "A-P" parameters of a wave, are deterministically related to the I and Q branch amplitudes, and vice-versa, in principle. Hence the receiver can convert between the I-Q parameters and the A-P parameters of the wave, analytically. The receiver can thereby select a demodulation method that minimizes complexity or maximizes noise mitigation using whichever modulation scheme is most suitable.

Figure 1B:
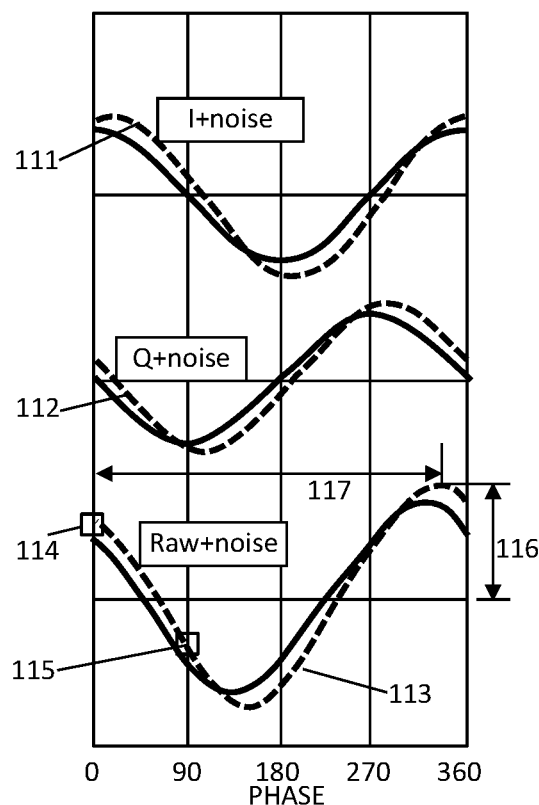
FIG. 1B is a schematic showing an exemplary embodiment of a wave modulated using pulse-amplitude modulation with added noise, according to some embodiments.

FIG. 1B is a schematic showing an exemplary embodiment of a wave modulated using pulse-amplitude modulation with added noise, according to some embodiments. As depicted in this non-limiting example, the transmitted I and Q waves, and the raw signal, are shown solid, and the same with added noise are shown dotted. Hence the wave 111 is the I branch signal, as-received including noise, while the wave 112 is the Q branch signal as-received including noise, and the wave 113 is the raw signal as-received including noise. In each case, the noise causes both an amplitude change and a phase change. The raw signal 113 including noise is the linear sum of the I and Q branch signals 111, 112 including noise. The zero-degree point 114 of the raw signal 113 is a measure of the I branch amplitude including noise, and the 90-degree point 115 is a measure of the Q branch amplitude including noise. (The zero and 90-degree phase angles are determined by the local oscillator, not by the as-received wave.) In addition, the amplitude 116 of the raw signal plus noise 113 is shown, and its phase 117 is also shown. Since the phase and amplitude distortions caused by the noise are likely to be similar in the message elements and the reference elements (if they are in close proximity), the receiver can demodulate the message elements by comparing the message element parameters to the as-received reference element parameters, using either the I-Q parameters or the A-P parameters, and can thereby mitigate the noise.

Figure 1C:
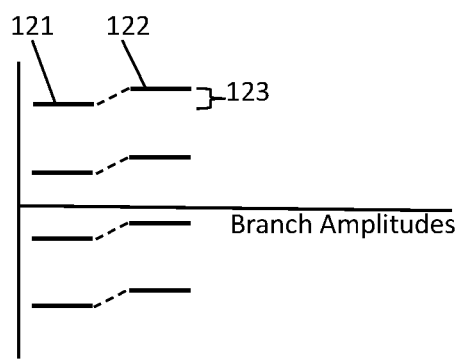
FIG. 1C is a sketch showing an exemplary embodiment of the branch amplitudes of a pulse-amplitude modulation scheme, according to some embodiments.

FIG. 1C is a sketch showing an exemplary embodiment of the branch amplitudes of a pulse-amplitude modulation scheme, according to some embodiments. As depicted in this non-limiting example, the four branch amplitudes 121 of a PAM modulation scheme for 16QAM are shown for the zero-noise case on the left, and with additive noise on the right. The four predetermined branch amplitudes 121 include the maximum positive amplitude, the minimum positive amplitude, the minimum negative amplitude, and the maximum negative amplitude levels, equally spaced. The I and Q branches are assumed, in this example, to have the same branch amplitudes, absent phase-dependent interference. In other embodiments, the I and Q branch amplitudes can be determined from the demodulation reference separately, and the message can be demodulated according to two separate calibration sets for the two branches. The branch amplitudes with additive noise 122 also show the noise shift 123, and is assumed the same for all branch amplitudes, that is, additive noise. By measuring the branch amplitudes of a demodulation reference, and then using those values to demodulate a subsequent message, the receiver can mitigate additive noise and interference, in some embodiments.

Figure 1D:
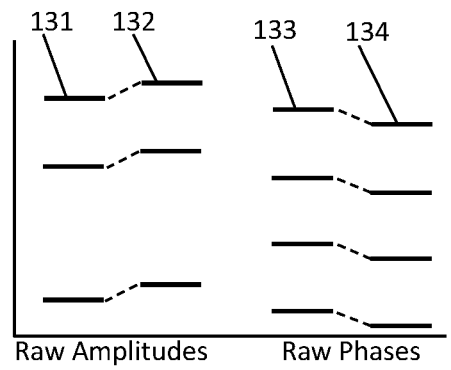
FIG. 1D is a sketch showing an exemplary embodiment of the raw signal amplitudes and phases of a modulation scheme, according to some embodiments.

FIG. 1D is a sketch showing an exemplary embodiment of the raw signal amplitudes and phases of a classical modulation scheme, according to some embodiments. As depicted in this non-limiting example, the amplitudes 131 of the raw signal (as-received, prior to I/Q branch separation) are shown, transmitted in PAM modulation but now analyzed for the raw signal amplitudes and phases. For 16QAM, there are only three raw amplitudes 131, corresponding to the maximum positive I branch summed with the maximum positive Q branch, the minimum positive I branch summed with the minimum positive Q branch, and one of the maximum positive branches summed with one of the minimum positive branches. Since the raw signal amplitudes are measured in magnitude by classical amplitude-phase modulation, there are no negative levels. In addition, the raw signal can have various phases 133 as shown. (For clarity in this graphic, only four of the phases are graphed, representing the four maximum-maximum combinations of 16QAM. If the signal were modulated in classical amplitude-phase modulation, four phases would be sufficient. But for PAM modulation and classical demodulation, the raw signal can have 12 distinct phases, due to the various combinations of branch signals.)

Also shown, connected by dashed lines, are the raw amplitude levels shifted by additive noise 132, and the raw phases shifted by noise 134. Although the message may be demodulated using a calibration set derived using either (PAM or classical) method, the two methods differ in sensitivity for various reasons. For example, the raw signal exposes phase-shift distortions, which are only indirectly reflected in the PAM branch amplitudes. In addition, each phase or amplitude measurement is subject to measurement uncertainties, which can be quite different for amplitude and phase measurements. Moreover, in PAM the branch separation is generally not perfect. More seriously, in PAM, the presumed 0-90 degree phases of the branches can be affected by the noise, upsetting the branch level scheme. (This latter defect does not apply to classical amplitude-phase demodulation because the raw-signal phase is explicitly measured). These limitations become more severe at high frequencies due to short integration times and high phase noise, and become especially critical at high modulation orders due to the closely-spaced amplitude levels.

Therefore, the systems and methods include the receiver analyzing each received demodulation reference and message element using both procedures, the I and Q branch amplitude measurements of PAM, and the raw signal amplitude and phase measurements. The systems and methods further include the receiver comparing those analysis results to reveal faulted message elements.

Figure 1E:
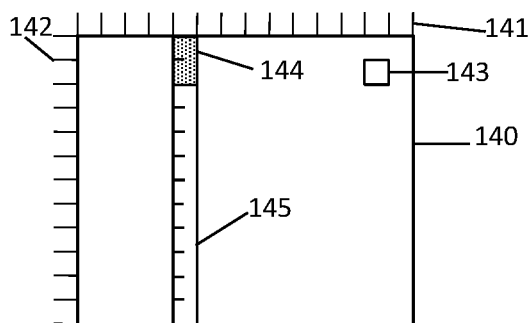
FIG. 1E is a schematic showing an exemplary embodiment of a resource grid with a two-point short-form demodulation reference and a frequency-spanning message, according to some embodiments.

FIG. 1E is a schematic showing an exemplary embodiment of a resource grid with a two-point short-form demodulation reference and a frequency-spanning message, according to some embodiments. As depicted in this non-limiting example, a resource grid 140 is a region of time and frequency including one slot of 14 symbol-times 141 and one resource block of 12 subcarriers 142. A single resource element is marked as 143. A time-spanning message 145 is shown, with message elements indicated by little marks, with a prepending two-point demodulation reference 144 (stippled). The message 145 and demodulation reference 144 occupy one symbol-time and multiple subcarriers, and therefore are termed "frequency-spanning" herein. Since the receiver receives the message elements 145 at the same time as the demodulation reference 144, it is generally not feasible to use the demodulation reference 144 to demodulate the message 145 during reception. Instead, the receiver can measure parameters about the demodulation reference 144 and the message 145 during reception, and then analyze those parameters to demodulate the message 145 during the next symbol-time.

Figure 1F:
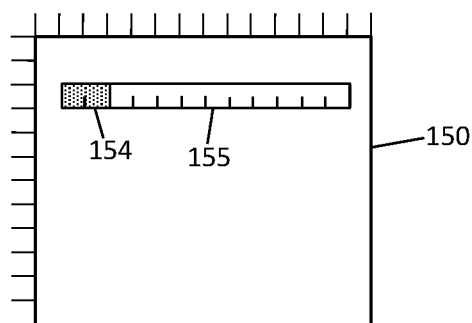
FIG. 1F is a schematic showing an exemplary embodiment of a resource grid with a two-point short-form demodulation reference and a time-spanning message, according to some embodiments.

FIG. 1F is a schematic showing an exemplary embodiment of a resource grid with a two-point short-form demodulation reference and a time-spanning message, according to some embodiments. As depicted in this non-limiting example, a resource grid 150, including one slot in time and one resource block in frequency, includes a time-spanning demodulation reference 154 and message 155. The demodulation reference 154 and the message 155 occupy a single subcarrier and multiple symbol-times, and therefore are termed "time-spanning" herein. In this case, the receiver can receive the demodulation reference 154 before receiving the message 155, and therefore can determine the modulation levels in advance of the message elements, and hence can demodulate the message elements as they are received. Alternatively, a reduced-capability receiver may opt to record parameters of the demodulation reference 154 and the message 155 as they are received, and then analyze them later for demodulation.

Time-spanning and frequency-spanning messages of the same length consume the same amount of resource grid area. However, frequency-spanning messages provide faster message delivery and better mitigation of time-dependent interference (if the demodulation reference is placed in the same symbol-time as the message), but requires greater speed, bandwidth, faster analog and digital signal processing, more computational speed, and more memory capacity than time-spanning messages, in some embodiments. High-performance user devices that demand high volume and low latency may beneficially employ frequency-spanning communications. On the other hand, time-spanning messages may be easier for narrow-band reduced-capability receivers to process, especially if the receiver has limited signal processing electronics and low speed. Applications involving low-cost single-task devices, such as simple sensors and actuators, which generally require very little communication and are quite delay-tolerant, may beneficially employ time-spanning communications, according to some embodiments. Therefore, protocols may be included in wireless standards to accommodate both types of devices and both types of message spanning orientation.

The systems and methods further disclose methods to demodulate a message using a two-point short-form demodulation reference using classical amplitude and phase demodulation of the raw signal, as explained in the following examples.

Figure 2A:
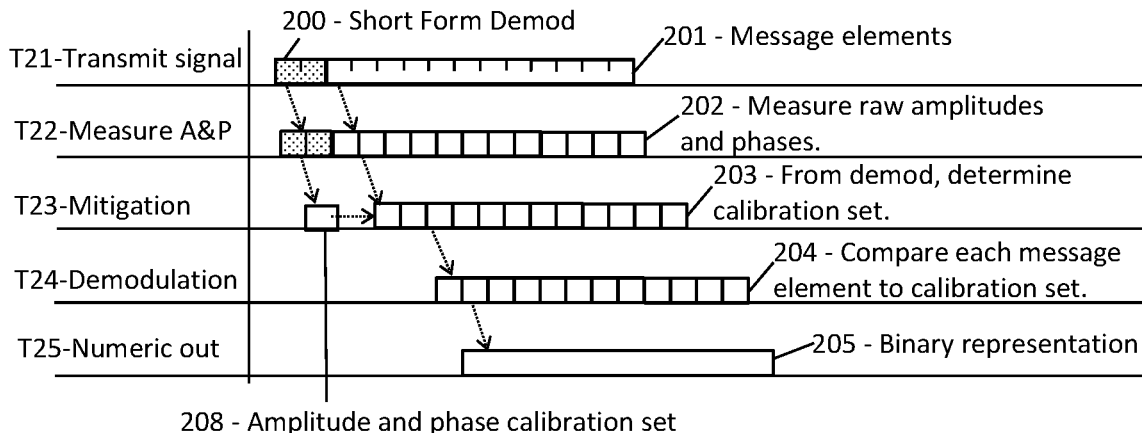
FIG. 2A is a sequence chart showing an exemplary embodiment of a process for demodulating a message using classical amplitude-phase modulation, according to some embodiments.

FIG. 2A is a sequence chart showing an exemplary embodiment of a process for demodulating a message using classical amplitude-phase modulation, according to some embodiments. Actions and events are shown on separate lines, each line occurring at a different time as labeled. Sequence charts generally show messages horizontally for clarity, but in fact the messages and demodulation references may be frequency-spanning in many cases. Timing is indicated on the left. Arrows show information flow.

As depicted in this non-limiting example, at time T21 a transmitter transmits a frequency-spanning signal including a demodulation reference 200 (stippled) and a message 201. The individual elements of the demodulation reference 200 and the message 201 are shown with little marks demarking each element. The demodulation reference is a two-point short-form demodulation reference, which is a sub-message including two reference elements including one reference element exhibiting the maximum raw-signal amplitude and phase of the modulation scheme, and the other reference element exhibiting the minimum amplitude and phase of the modulation scheme. The receiver can determine all of the amplitude and phase levels of the modulation scheme from the two-point short-form demodulation reference 200.

At time T22, a receiver receives the demodulation reference and the message simultaneously. The receiver measures the raw-signal amplitudes and phases 202 of the two reference elements and of the message elements, as they are received in one symbol-time (other versions are disclosed below). The receiver may store those measurement values in, for example, a memory for subsequent analysis and demodulation.

At time T23, the receiver analyzes the reference elements of the demodulation reference 200 and thereby determines the levels 203 of the modulation scheme, including noise. The maximum and minimum amplitude and phase levels of the modulation scheme may be determined from the amplitude and phase levels exhibited in the demodulation reference 200, and those levels may be added to the calibration set 208. Then, any intermediate levels of the modulation scheme may be calculated, by interpolation for example, from the exhibited levels. Since the demodulation reference 200 is in very close proximity to the message 201, current noise and interference may distort the amplitude and phase values of the demodulation reference 200 in the same way as the message elements, so that the message 201 may be demodulated with the noise largely canceled.

At time T24, the processor demodulates each message element 201, by comparing the raw-signal amplitude and phase of each message element 201 to the modulation scheme amplitude and phase levels as recorded in the calibration set 208. The receiver determines the modulation state 204 of each message element 201 according to the closest match with the amplitude and phase levels of the calibration set.

At time T25, the receiver renders the demodulated message as a numerical sequence. For example, each of the amplitude and phase levels in the calibration set 208 may be represented by a number, and each demodulated message element may be represented by the two numbers representing the amplitude and phase of the raw signal of each message element. The numerical (usually binary) representation 205 is then sent to a processor for interpretation of the message 201.

Figure 2B:
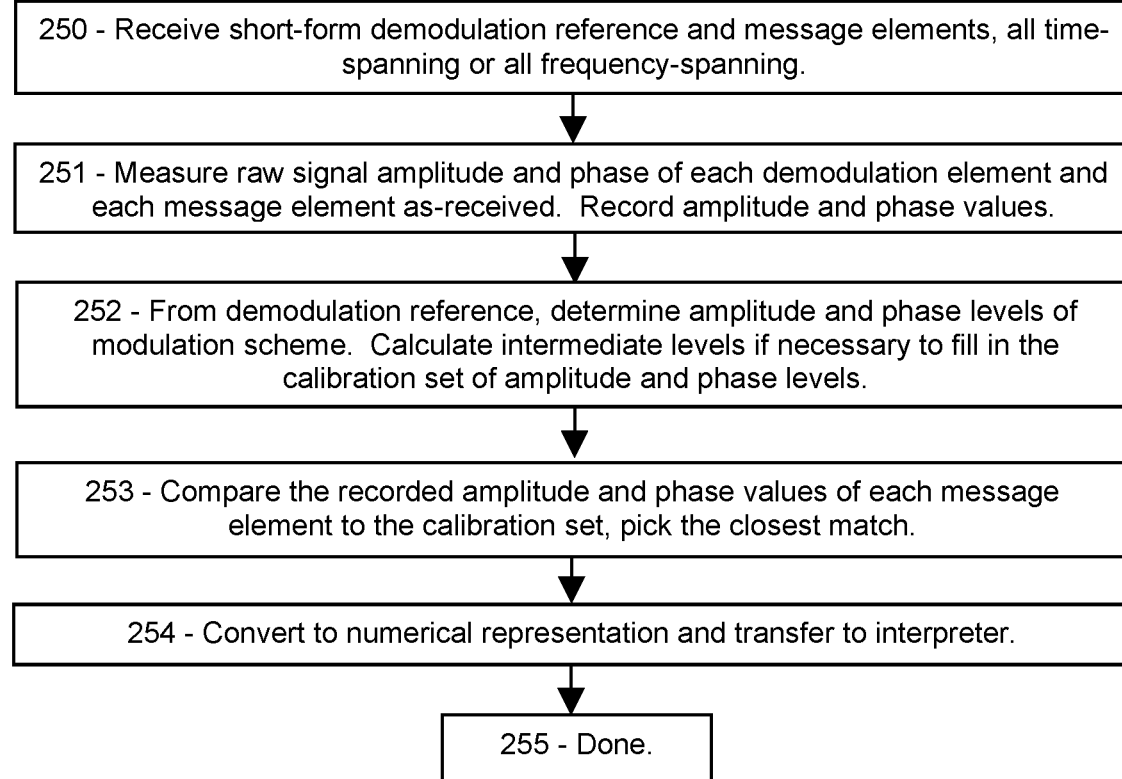
FIG. 2B is a flowchart showing an exemplary embodiment of a process for demodulating a message using classical amplitude-phase modulation, according to some embodiments.

FIG. 2B is a flowchart showing an exemplary embodiment of a process for demodulating a message using classical amplitude-phase modulation, according to some embodiments. As depicted in this non-limiting example, at 250 a receiving entity receives a message and a demodulation reference with two resource elements, all frequency-spanning (in a single symbol-time) or time-spanning (in a single subcarrier).

At 251, while the raw signal is being received, the receiver measures the amplitude and phase of each message element and demodulation reference element, and records those amplitude and phase values in a memory.

At 252, the receiver analyzes the stored data to determine the maximum and minimum amplitude levels and the maximum and minimum phase levels of the modulation scheme, and calculates any intermediate levels by interpolation, and stores those modulation levels in the calibration set.

At 253, the receiver compares each message element's amplitude and phase to the amplitude levels and phase levels of the calibration set, selecting the closest match in each case. Optionally, the receiver may flag message elements that deviate from the calibration set amplitude and phase levels. For example, if a message element's amplitude or phase differs from the closest amplitude or phase level in the calibration set by more than a predetermined threshold, such a modulation error may indicate a message fault. If the message is later determined to be corrupted, according to an error-check code or parity or the like, then the receiver may attempt to recover the message by varying the faulted message elements to different amplitude levels and/or phase levels. Advantageously, the receiver may be able to determine which message element is likely faulted, and may thereby reduce, by an enormous factor, the number of variations required for message recovery.

At 254, the receiver renders the message as a numerical sequence according to the amplitude and phase levels exhibited by the sequence of message elements, and transfers the numerical sequence to an interpreter, which is expected to know what to do with the message in that form. The reception is done at 255.

In some embodiments, the receiver may include phase-selective detectors to measure each subcarrier signal individually, as the demodulation reference and message elements are received. For example, a pair of radio-frequency mixers may be driven by a local oscillator to extract two orthogonal components of each subcarrier signal. The receiver may then determine the amplitude and phase of the raw signal by calculating the trigonometric sum of the two component amplitudes.

An advantage of providing a demodulation reference frequency-spanning and in the same symbol-time as the message, may be that the demodulation reference may thereby deliver the message rapidly, as opposed to a time-spanning message that occupies a number of symbol-times at a single frequency. On the other hand, an advantage of providing the demodulation reference in the same subcarrier as a time-spanning message, may be that the signal processing demands on a reduced-capability receiver may be accommodated. An advantage of providing the demodulation reference and the signal together (concatenated or otherwise in very close proximity) may be that the demodulation reference may have the same or similar noise and interference distortions as the message elements, and therefore may provide improved mitigation. An advantage of providing a two-point short-form demodulation reference may be that it is short, just two reference elements. Another advantage of providing a short-form demodulation reference may be that the maximum and minimum amplitude and phase levels of the modulation scheme can be explicitly provided, while any intermediate levels can be calculated by interpolation. An advantage of analyzing a received message by both PAM I&Q levels and raw-signal amplitude and phase levels may be to reveal a faulted message element that may fall within allowable ranges for one of the demodulation schemes but not the other.

Another advantage may be that the procedures of FIG. 2A-2B may be implemented as a software (or firmware) update, without requiring new hardware development, and therefore may be implemented at low cost, according to some embodiments. The procedures of FIG. 2A-2B may be implemented as a system or apparatus, a method, or instructions in non-transient computer-readable media for causing a computing environment, such as a user device, a base station, or other signally coupled component of a wireless network, to implement the procedure. Another advantage may be that the depicted low-complexity procedures may be compatible with devices that may have difficulty complying with complex prior-art procedures, and therefore may enable applications involving low-cost reduced-capability devices that otherwise may be unfeasible. Other advantages may be apparent to one of ordinary skill in the art, given this teaching. The advantages listed in this paragraph are also true for other embodiments described below.

The systems and methods further include methods for demodulating a message using pulse-amplitude modulation, as in the following examples.

Figure 3A:
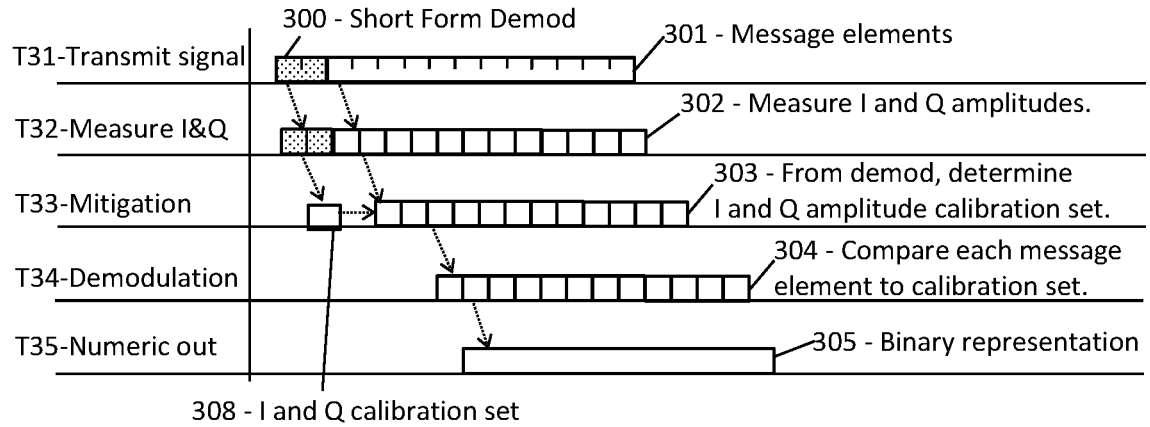
FIG. 3A is a sequence chart showing an exemplary embodiment of a process for demodulating a message using pulse-amplitude modulation, according to some embodiments.

FIG. 3A is a sequence chart showing an exemplary embodiment of a process for demodulating a message using pulse-amplitude modulation, according to some embodiments. As depicted in this non-limiting example, at time T31 a transmitter transmits a signal including a demodulation reference 300 (stippled) and a message 301. The demodulation reference 300 is a two-point short-form pulse-amplitude demodulation reference including two reference elements, in which one reference element exhibits the maximum I and Q branch amplitudes of the modulation scheme, and the other reference element exhibits the minimum I and Q branch amplitudes of the modulation scheme.

At time T32, a receiver receives the demodulation reference 300 and the message 301, and measures the amplitudes 302 of the I and Q branches for each reference element and message element. The receiver may store those measurement values in, for example, a memory for later analysis and demodulation.

At time T33, the receiver retrieves the stored parameter data of the demodulation reference 300, including the branch amplitude levels 303 of the modulation scheme. The maximum and minimum branch amplitude levels of the modulation scheme may be determined from the amplitudes exhibited in the I and Q branches of the demodulation reference 300, and those branch amplitude levels may be added to the calibration set 308. In addition, intermediate levels of the modulation scheme may be calculated, by interpolation for example, from the exhibited levels, and added to the calibration set 308. In this example, the demodulation reference 300 is in very close proximity to the message 301, and therefore the noise and interference may distort the branch amplitude values of the demodulation reference 300 in the same way as the message elements; hence the message 301 may be demodulated with the noise largely canceled.

At time T34, the processor demodulates each message element 301, by comparing the I and Q branch amplitudes of each message element 301 to the modulation scheme branch amplitude levels as recorded in the calibration set 308. The receiver determines the modulation state 304 of each message element 301 according to the closest match with the I and Q branch amplitude levels of the calibration set 308.

At time T35, the receiver renders the demodulated message as a numerical sequence 305. The numerical representation is then sent to a processor for interpretation of the message 301.

Figure 3B:
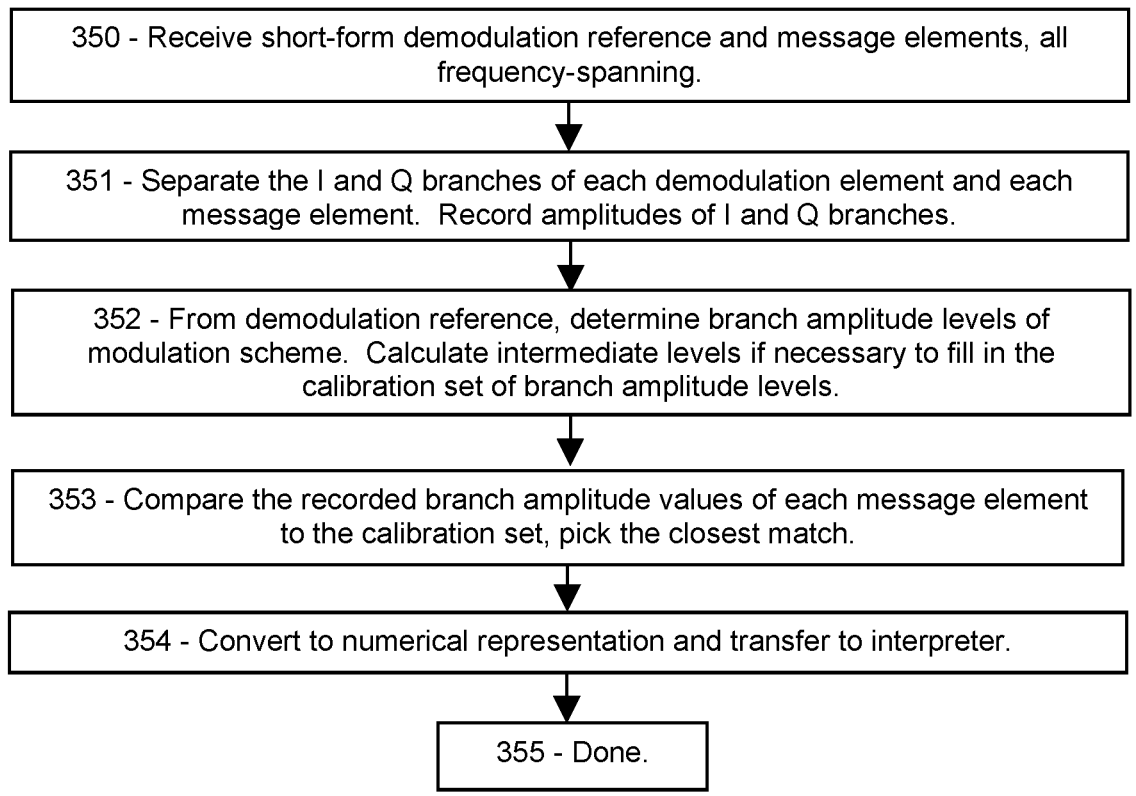
FIG. 3B is a flowchart showing an exemplary embodiment of a process for demodulating a message using pulse-amplitude modulation, according to some embodiments.

FIG. 3B is a flowchart showing an exemplary embodiment of a process for demodulating a message using pulse-amplitude modulation, according to some embodiments. As depicted in this non-limiting example, at 350 a receiving entity receives a demodulation reference with two resource elements, concatenated with a message, all frequency-spanning (in a single symbol-time).

At 351, while the signals are being received, the receiver separates the I and Q branches and measures the two branch amplitudes of each message element, and records those values in a memory.

At 352, the receiver determines the maximum and minimum I and Q branch amplitude levels of the modulation scheme, and stores those levels in the calibration set. The receiver may also calculate any intermediate levels by interpolation, or other calculation, and may store those modulation levels in memory as the calibration set as well.

At 353, the receiver compares each message element's I and Q branch amplitudes to the branch amplitude levels of the calibration set, selecting the closest match in each case. Optionally, the receiver may flag message elements that deviate from the modulation amplitude levels for message mitigation if necessary.

At 354, the receiver renders the message as a numerical sequence according to the I and Q branch amplitude levels exhibited by the sequence of message elements, and transfers the sequence to an interpreter. The reception is done at 355.

As a further alternative, at 351, the receiver may measure the raw-signal total amplitude and phase of each subcarrier signal, and then may calculate the branch amplitude values analytically, without actually separating the component signals.

The following examples disclose methods to demodulate a message using a two-point short-form demodulation reference using classical amplitude and phase demodulation of the raw signal, with real-time digitization of the incoming signal.

Figure 4A:
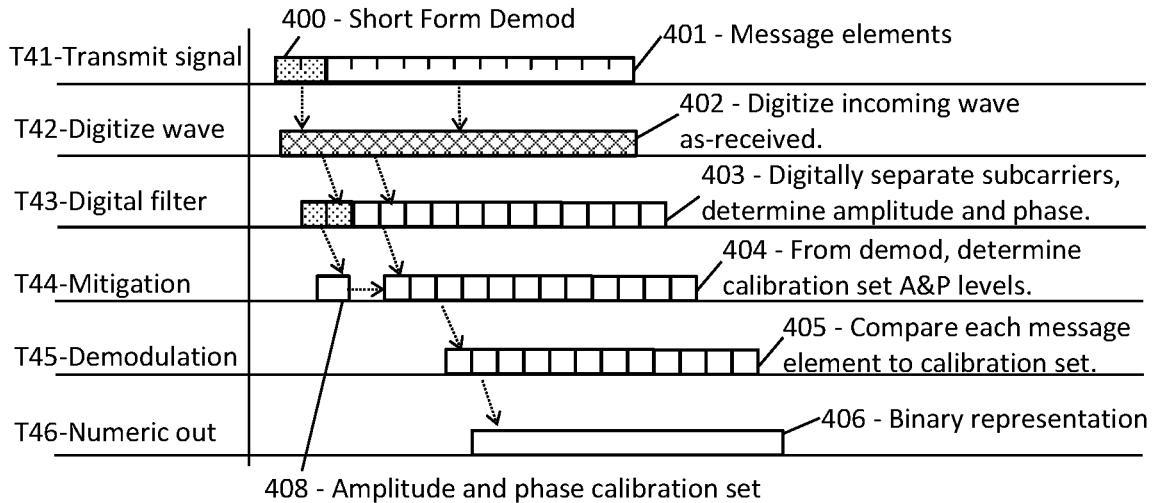
FIG. 4A is a sequence chart showing an exemplary embodiment of a process for digitizing and then demodulating a message using classical amplitude-phase modulation, according to some embodiments.

FIG. 4A is a sequence chart showing an exemplary embodiment of a process for digitizing and then demodulating a message using classical amplitude-phase modulation of the raw signal, according to some embodiments. As depicted in this non-limiting example, at time T41 a transmitter transmits a signal including a demodulation reference 400 (stippled) and a message 401.

At time T42, the receiver receives the complex sum-signal wave including all subcarrier signals added together. The receiver digitizes the waveform by measuring the signal amplitude at sufficiently short intervals and with sufficient precision to enable waveform analysis into frequency components. The receiver then stores the digitization results 402 in memory.

At time T43, the receiver digitally extracts each subcarrier raw signal from the digitized data, and measures the amplitude and phase of each resource element. The receiver thereby determines the amplitudes and phases 403 of each demodulation reference element and each message element.

At time T44, the receiver analyzes the reference elements of the demodulation reference 400 and thereby determines levels 404 of the modulation scheme. The maximum and minimum amplitude and phase levels of the modulation scheme may be determined from the amplitude and phase levels exhibited in the demodulation reference 400, and those levels may be added to the calibration set 408. Then, any intermediate levels of the modulation scheme may be calculated, by interpolation for example, from the exhibited levels, and added to the calibration set 408. Since the demodulation reference 400 is in very close proximity to the message 401, noise and interference may distort the amplitude and phase values of the demodulation reference 400 in the same way as the message elements, so that the message 401 may be demodulated with the noise largely canceled.

At time T45, the processor demodulates each message element 401, by comparing the raw-signal amplitude and phase of each message element 401 to the modulation scheme amplitude and phase levels as recorded in the calibration set 408. The receiver thereby determines the modulation state 405 of each message element 401 according to the closest match with the amplitude and phase levels of the calibration set.

At time T46, the receiver renders the demodulated message as a numerical sequence 406. The numerical representation is then sent to a processor for interpretation of the message 401.

Figure 4B:
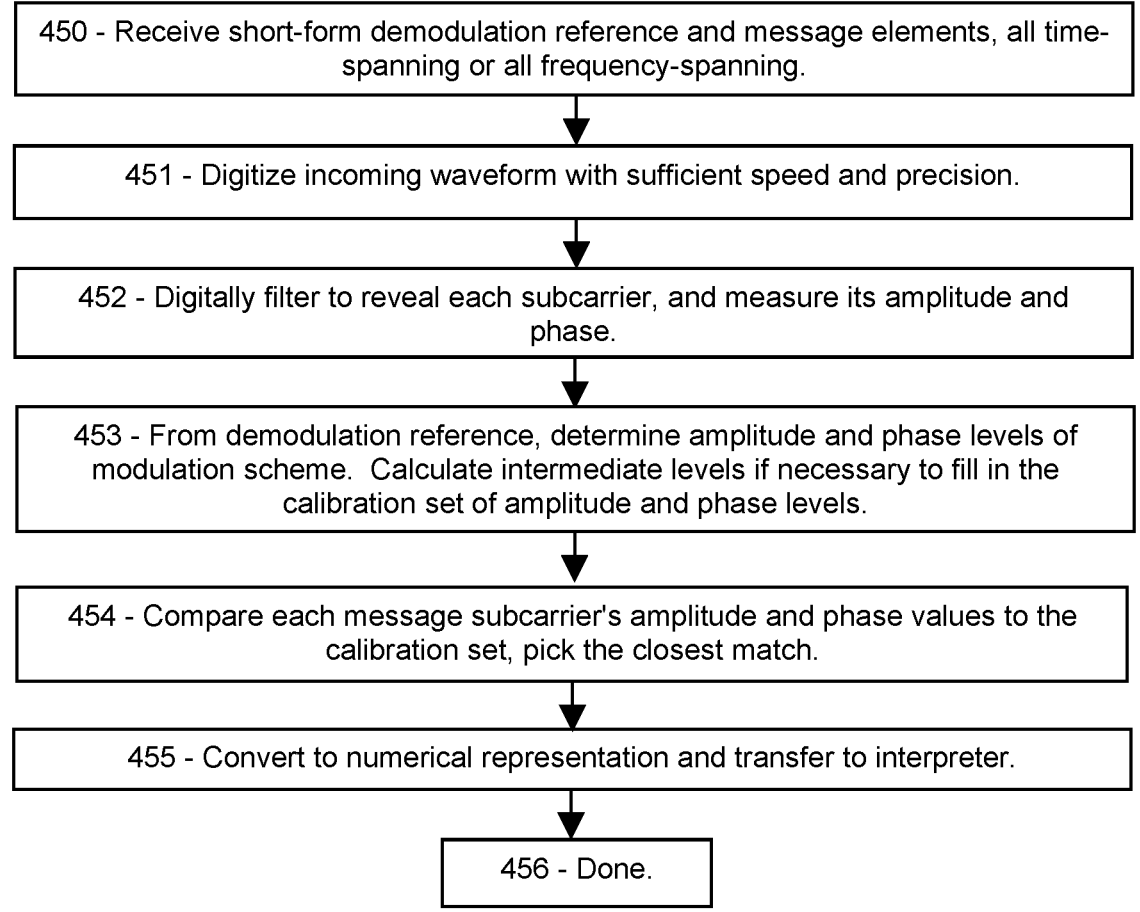
FIG. 4B is a flowchart showing an exemplary embodiment of a process for digitizing and then demodulating a message using classical amplitude-phase modulation, according to some embodiments.

FIG. 4B is a flowchart showing an exemplary embodiment of a process for digitizing and then demodulating a message using classical amplitude-phase modulation, according to some embodiments. As depicted in this non-limiting example, at 450 a receiving entity receives a message and a demodulation reference with two resource elements.

At 451, the receiver digitizes the incoming signal with sufficient speed and precision to enable subsequent separation of each subcarrier signal from the composite waveform. The receiver may store the digitized waveform in a memory.

At 452, the receiver digitally extracts each subcarrier signal for each reference element and each message element by analysis of the stored waveform data.

At 453, the receiver, based on the demodulation reference, determines the maximum and minimum amplitude levels and the maximum and minimum phase levels of the modulation scheme, and calculates any intermediate levels by interpolation, and stores those modulation levels in the calibration set.

At 454, the receiver compares each message element's amplitude and phase to the amplitude levels and phase levels of the calibration set, selecting the closest match in each case.

At 455, the receiver renders the message as a numerical sequence according to the amplitude and phase levels exhibited by the sequence of message elements, and transfers it to an interpreter. The reception is done at 456.

The systems and methods further include methods for demodulating a message using pulse-amplitude modulation with real-time digitization of the incoming signal, as in the following examples.

Figure 5A:
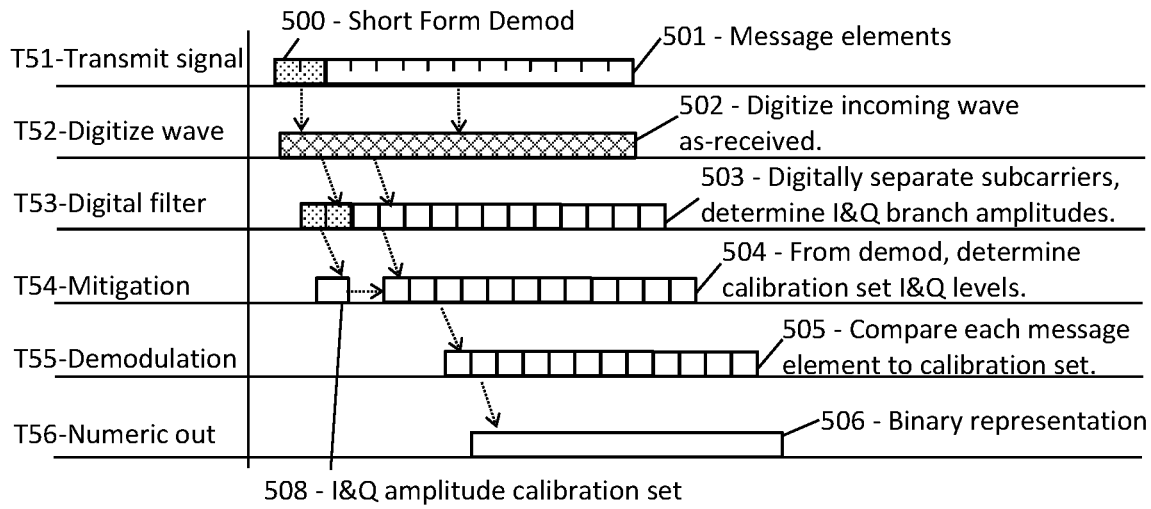
FIG. 5A is a sequence chart showing an exemplary embodiment of a process for digitizing and then demodulating a message using pulse-amplitude modulation, according to some embodiments.

FIG. 5A is a sequence chart showing an exemplary embodiment of a process for digitizing and then demodulating a message using pulse-amplitude modulation, according to some embodiments. As depicted in this non-limiting example, at time T51 a transmitter transmits a frequency-spanning signal including a demodulation reference 500 (stippled) and a message 501. The demodulation reference is a two-point short-form pulse-amplitude demodulation reference including two reference elements, in which one reference element exhibits the maximum I and Q branch amplitudes of the modulation scheme, and the other reference element exhibits the minimum I and Q branch amplitudes of the modulation scheme (or other equivalent combinations).

At time T52, the receiver receives the complex sum-signal wave including all subcarriers within a bandwidth, the various subcarrier signals added together. The receiver digitizes the waveform by measuring the sum-signal amplitude at sufficiently short intervals and with sufficient precision to enable waveform analysis into frequency components. The receiver stores the digitization results 502 in memory.

At time T53, the receiver digitally extracts each subcarrier raw signal from the stored data, separates the I and Q branches, and measures the branch amplitudes 503 of each demodulation reference element and each message element.

At time T54, the receiver analyzes the demodulation reference elements 500 and thereby determines the branch amplitude levels 504 of the modulation scheme. The maximum and minimum branch amplitude levels of the modulation scheme may be determined from the amplitudes exhibited in the branches of the demodulation reference 500, and those I and Q branch amplitude levels 504 may be added to the calibration set 508. Then, any other levels of the modulation scheme may be calculated, by interpolation for example, from the exhibited levels. Since the demodulation reference 500 is in very close proximity to the message 501, noise and interference may distort the branch amplitude values of the demodulation reference 500 in the same way as the message elements, so that the message 501 may be demodulated with the noise largely canceled.

At time T55, the processor demodulates each message element 501, by comparing the I and Q branch amplitudes of each message element 501 to the modulation scheme branch amplitude levels as recorded in the calibration set 508. The receiver determines the modulation state 505 of each message element 501 according to the closest match with the I and Q branch amplitude levels of the calibration set 508.

At time T56, the receiver renders the demodulated message as a numerical sequence 506. The numerical sequence representation 506 is then sent to a processor for interpretation of the message 501.

Figure 5B:
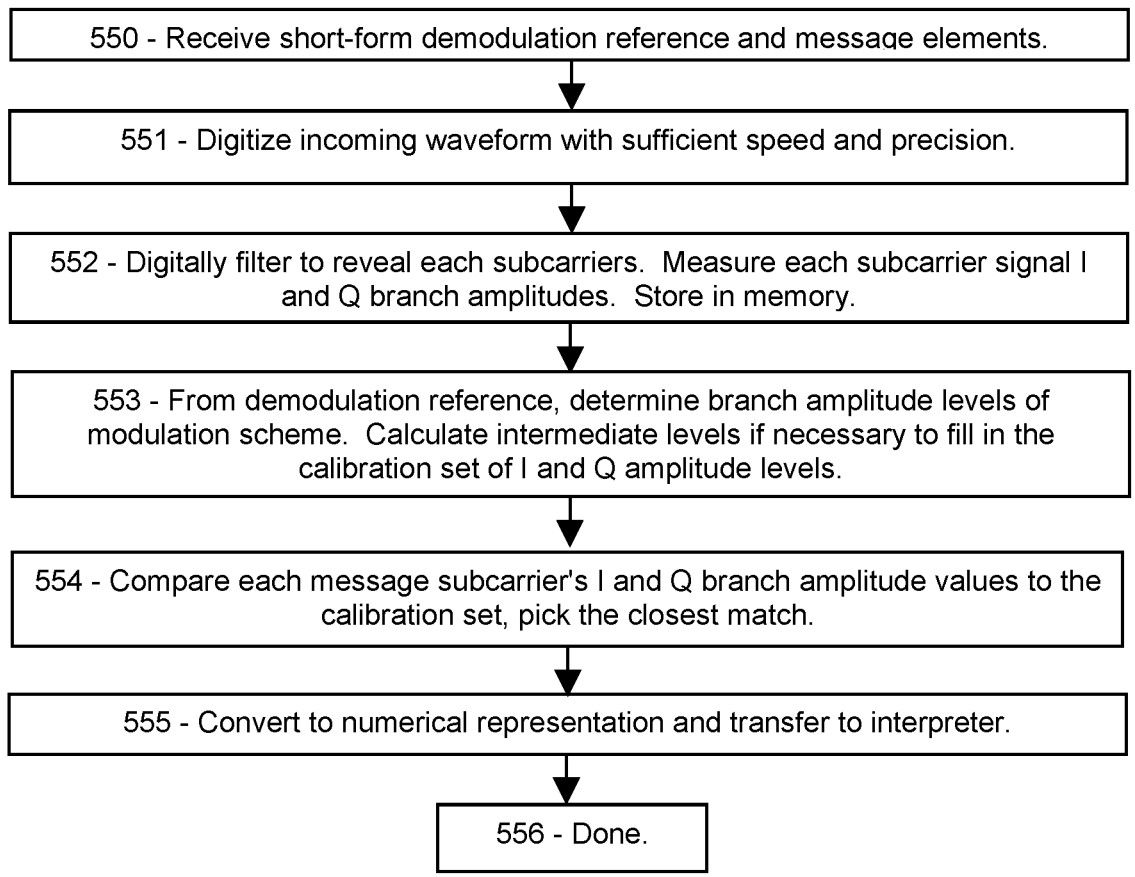
FIG. 5B is a flowchart showing an exemplary embodiment of a process for digitizing and then demodulating a message using pulse-amplitude modulation, according to some embodiments.

FIG. 5B is a flowchart showing an exemplary embodiment of a process for digitizing and then demodulating a message using pulse-amplitude modulation, according to some embodiments. As depicted in this non-limiting example, at 550 a receiving entity receives a demodulation reference with two resource elements, and a message.

At 551, the receiver digitizes the incoming signal with sufficient speed and precision to enable subsequent separation of each subcarrier signal from the composite waveform. The receiver stores the digitized waveform in a memory.

At 552, the receiver digitally extracts, from the stored data, each subcarrier signal for each reference element and message element.

At 553, the receiver, based on the demodulation reference, determines the maximum and minimum I and Q branch amplitude levels of the modulation scheme, and calculates any intermediate levels by interpolation, and stores those modulation levels in memory as the calibration set.

At 554, the receiver compares each message element's I and Q branch amplitude values to the branch amplitude levels of the calibration set, selecting the closest match in each case.

At 555, the receiver renders the message as a numerical sequence according to the amplitude and phase levels exhibited by the sequence of message elements, and transfers it to an interpreter which is expected to know what to do with the message in that form. The reception is done at 556.

The disclosed systems and methods, implemented in certain embodiments, can thereby provide demodulation for frequency-spanning and time-spanning messages, using a closely proximate demodulation reference for updating the amplitude and optionally phase levels of a modulation scheme, modulated according to classical amplitude-phase modulation or pulse-amplitude modulation, by performing signal analysis on the message and demodulation reference while they are being received, or by measuring certain (amplitude or phase) parameters of the wave components as-received, or by digitizing the message and demodulation reference for subsequent digital signal analysis. In addition, by comparing the message element modulations to the demodulation reference modulations, the receiver may reveal faulted message elements, and thereby enable message recovery, in some embodiments. In addition, by employing only low-speed electronics and low-complexity analysis procedures, user devices such as reduced-capability user devices may be able to perform the demodulation, according to some embodiments.

The wireless embodiments of this disclosure may be aptly suited for cloud backup protection, according to some embodiments. Furthermore, the cloud backup can be provided cyber-security, such as blockchain, to lock or protect data, thereby preventing malevolent actors from making changes. The cyber-security may thereby avoid changes that, in some applications, could result in hazards including lethal hazards, such as in applications related to traffic safety, electric grid management, law enforcement, or national security.

In some embodiments, non-transitory computer-readable media may include instructions that, when executed by a computing environment, cause a method to be performed, the method according to the principles disclosed herein. In some embodiments, the instructions (such as software or firmware) may be upgradable or updatable, to provide additional capabilities and/or to fix errors and/or to remove security vulnerabilities, among many other reasons for updating software. In some embodiments, the updates may be provided monthly, quarterly, annually, every 2 or 3 or 4 years, or upon other interval, or at the convenience of the owner, for example. In some embodiments, the updates (especially updates providing added capabilities) may be provided on a fee basis. The intent of the updates may be to cause the updated software to perform better than previously, and to thereby provide additional user satisfaction.

The systems and methods may be fully implemented in any number of computing devices. Typically, instructions are laid out on computer readable media, generally non-transitory, and these instructions are sufficient to allow a processor in the computing device to implement the method of the invention. The computer readable medium may be a hard drive or solid state storage having instructions that, when run, or sooner, are loaded into random access memory. Inputs to the application, e.g., from the plurality of users or from any one user, may be by any number of appropriate computer input devices. For example, users may employ vehicular controls, as well as a keyboard, mouse, touchscreen, joystick, trackpad, other pointing device, or any other such computer input device to input data relevant to the calculations. Data may also be input by way of one or more sensors on the robot, an inserted memory chip, hard drive, flash drives, flash memory, optical media, magnetic media, or any other type of file-storing medium. The outputs may be delivered to a user by way of signals transmitted to robot steering and throttle controls, a video graphics card or integrated graphics chipset coupled to a display that may be seen by a user. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., embedded systems and processors, personal computers, laptop computers, notebook computers, net book computers, handheld computers, personal digital assistants, mobile phones, smart phones, tablet computers, and also on devices specifically designed for these purpose. In one implementation, a user of a smart phone or Wi-Fi-connected device downloads a copy of the application to their device from a server using a wireless Internet connection. An appropriate authentication procedure and secure transaction process may provide for payment to be made to the seller. The application may download over the mobile connection, or over the Wi-Fi or other wireless network connection. The application may then be run by the user. Such a networked system may provide a suitable computing environment for an implementation in which a plurality of users provide separate inputs to the system and method.

It is to be understood that the foregoing description is not a definition of the invention but is a description of one or more preferred exemplary embodiments of the invention. The invention is not limited to the particular embodiments(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater, or different steps than that shown here. All such other embodiments, changes, and modifications are intended to come within the scope of the appended claims.

As used in this specification and claims, the terms "for example", "e.g.", "for instance", "such as", and "like" and the terms "comprising", "having", "including", and their other verb forms, when used in conjunction with a listing of one or more components or other items, are each to be construed as open-ended, meaning that the listing is not to be considered as excluding other additional components or items. Other terms are to be construed using their broadest reasonable meaning unless they are used in a context that requires a different interpretation.

The invention claimed is:

1. A method for demodulating a wireless message, the method comprising:
   receiving a demodulation reference comprising one or more demodulation reference elements, each demodulation reference element modulated according to a modulation scheme;
   receiving a message comprising one or more message elements, each message element modulated according to the modulation scheme;
   determining, according to the demodulation reference elements, one or more modulation levels;
   for each message element, determining one or more modulation values; and
   demodulating each message element by comparing the one or more modulation values of the message element to the one or more modulation levels, and selecting the closest match.

2. The method of claim 1, wherein the message is received according to 5G or 6G technology.

3. The method of claim 1, further comprising:
   assigning a distinct number to each of the modulation levels; and
   for each message element, determining which number or numbers correspond to the modulation values of the message element.

4. The method of claim 1, wherein each demodulation reference element comprises a raw signal, and the modulation levels of the demodulation reference element comprise an amplitude of the raw signal and a phase of the raw signal.

5. The method of claim 1, wherein each demodulation reference element comprises an I-branch signal plus a Q-branch signal phase-shifted relative to the I-branch signal, and the modulation levels of each demodulation reference element comprise an amplitude of the I-branch signal and an amplitude of the Q-branch signal.

6. The method of claim 1, further comprising calculating one or more additional modulation levels by combining two or more of the modulation levels of the demodulation reference.

7. The method of claim 1, further comprising:
   for each particular demodulation reference element and each particular message element, measuring a raw signal amplitude and a raw signal phase associated with the particular demodulation reference element or the particular message element; and
   recording the measured amplitudes and phases in a memory.

8. The method of claim 1, further comprising:
   for each particular demodulation reference element and each particular message element, measuring an I-branch signal amplitude and a Q-branch signal amplitude, the Q-branch signal phase-shifted by 90 degrees relative to the I-branch signal; and
   recording the measured amplitudes in a memory.

9. The method of claim 1, further comprising:
   digitizing the demodulation reference and the message by repeatedly converting a received voltage to a number, thereby forming a sequence of numbers;
   storing the sequence of numbers in a memory; and
   for each demodulation reference element and each phase element, determining, from the sequence of numbers, a raw signal amplitude and a raw signal phase.

10. The method of claim 1, further comprising:
    digitizing the demodulation reference and the message by repeatedly converting a received voltage to a number, thereby forming a sequence of numbers;
    storing the sequence of numbers in a memory; and
    for each demodulation reference element and each phase element, determining, from the sequence of numbers, an I-branch signal amplitude and a Q-branch signal amplitude, the Q-branch signal at 90 degrees phase shift relative to the I-branch signal.

11. The method of claim 1, further comprising:
    determining a difference between a modulation value of a message element and a closest modulation level; and
    if the difference is greater than a predetermined threshold, determining that the message element may be faulted.

12. The method of claim 1, further comprising:

for each message element, determining a raw signal amplitude, a raw signal phase, an I-branch amplitude, and a Q-branch amplitude; and determining whether the message element is faulted by comparing the raw signal amplitude to a sum of the I-branch signal and the Q-branch signal, and by comparing the raw signal phase to a ratio of the I-branch signal to the Q-branch signal.

13. A receiver in a wireless network, configured to:

receive a demodulation reference comprising demodulation reference elements modulated according to a modulation scheme;

determine, according to the demodulation reference elements, one or more modulation levels of the modulation scheme;

associate a distinct numerical value to each of the one or more modulation levels;

receive a message comprising message elements modulated according to the modulation scheme;

for each message element, determine one or more modulation values; and for each modulation value, determine which particular modulation level most closely matches the modulation value, determine which numerical value is associated with the particular modulation level, and assign the numerical value so determined to the message element.

14. The receiver of claim 13, wherein, for each message element, the one or more modulation levels comprise either (a) an amplitude and a phase of a raw signal of the message element, or (b) an I-branch signal amplitude and a Q-branch signal amplitude, the Q-branch signal phase-shifted relative to the I-branch signal.

15. The receiver of claim 13, further configured to:

measure the one or more modulation levels of each demodulation reference element while the demodulation reference is being received; and measure the one or more modulation values of each message element while the message is being received.

16. The receiver of claim 13, further configured to:

digitize an as-received signal by repeatedly measuring a voltage and converting the voltage to a digital quantity; and determine, from the digitized signal, for each message element, either (a) a raw signal amplitude and a raw signal phase, or (b) an I-branch signal amplitude and a Q-branch signal amplitude, the Q-branch signal at 90 degrees phase shift relative to the I-branch signal.

17. Non-transitory computer-readable media in a memory of a base station of a wireless network comprising user devices, the media containing instructions that, when implemented by a computing environment, cause a method to be performed, the method comprising:

receiving, from a user device, a demodulation reference and a message;

determining, according to the demodulation reference, one or more modulation levels of a modulation scheme;

associating, with each of the modulation levels, a numerical representation, respectively;

determining, according to each message element of the message, one or more modulation values;

selecting, for each modulation value, the modulation level closest to the modulation value; and concatenating the numerical values associated with the selected modulation values of the message elements.

18. The media of claim 17, wherein the modulation levels comprise either:

an amplitude of a raw signal of each demodulation reference element and a phase of the raw signal of the demodulation reference element; or an amplitude of an I-branch signal and an amplitude of a Q-branch signal, the Q-branch signal phase-shifted relative to the I-branch signal, and the sum of the I branch signals and the Q-branch signals comprising the raw signal; or both of the above.

19. The media of claim 17, further comprising:

measuring, during reception, an amplitude or a phase or both, of each message element; and determining, after reception, the modulation values of the message elements.

20. The media of claim 17, further comprising:

digitizing, during reception, a sum-signal comprising a sum of the demodulation reference elements and the message elements; and after reception, determining, from the digitized sum-signal, for each of the demodulation reference elements and each of the message elements, either (a) a raw signal amplitude and a raw signal phase, respectively, or (b) an amplitude of an I-branch signal and an amplitude of a Q-branch signal phase-shifted relative to the I-branch signal, respectively.

\* \* \* \* \*